(12) United States Patent
Ceccanese et al.

(10) Patent No.: US 6,412,848 B1
(45) Date of Patent: Jul. 2, 2002

(54) VEHICLE DISPLAY MONITOR SYSTEM

(75) Inventors: Anthony B. Ceccanese; Curtis C. Kucera; Robert A. Napora, all of Eugene; James W. Johnson, Elmira, all of OR (US)

(73) Assignee: Rosen Products LLC, Eugene, OR (US)

( * ) Notice: Subject to any disclaimer, the term of this patent is extended or adjusted under 35 U.S.C. 154(b) by 0 days.

(21) Appl. No.: 09/626,210

(22) Filed: Jul. 26, 2000

Related U.S. Application Data

(60) Provisional application No. 60/163,134, filed on Nov. 2, 1999, and provisional application No. 60/206,589, filed on May 23, 2000.

(51) Int. Cl.[7] .............................. B60N 3/12; B60R 5/00; B60R 7/00; B60R 9/04; B62D 43/00
(52) U.S. Cl. ..................... 296/37.7; 224/311; 348/837
(58) Field of Search .................. 296/37.7; 224/311, 224/548, 553, 929; 348/837; 340/436, 903, 937

(56) References Cited

U.S. PATENT DOCUMENTS

| | | | |
|---|---|---|---|
| 4,824,159 A | | 4/1989 | Fluharty et al. ........... 296/37.7 |
| 4,844,533 A | * | 7/1989 | Dowd et al. ............... 296/214 |
| 5,062,559 A | * | 11/1991 | Falcoff ..................... 224/311 |
| 5,593,124 A | * | 1/1997 | Wang ..................... 248/231.81 |
| 5,636,891 A | * | 6/1997 | Van Order et al. ......... 296/37.7 |
| 5,822,023 A | | 10/1998 | Suman et al. ............. 348/837 |
| 5,887,929 A | * | 3/1999 | Miller et al. ............... 296/37.7 |
| 5,946,055 A | | 8/1999 | Rosen ..................... 348/837 |
| 6,019,411 A | * | 2/2000 | Carter et al. .............. 296/37.7 |
| 6,176,536 B1 | * | 1/2001 | Miller et al. |

FOREIGN PATENT DOCUMENTS

JP 2-149083 6/1990

* cited by examiner

*Primary Examiner*—Joseph D. Pape
*Assistant Examiner*—Scott Carpenter
(74) *Attorney, Agent, or Firm*—Kolisch Hartwell Dickinson McCormack & Heuser

(57) ABSTRACT

A ceiling-mountable display monitor system for the passenger compartment of a vehicle. The display monitor system includes a display monitor coupled to a housing assembly. In one exemplary embodiment, the housing assembly is selectively adjustable for mounting in different vehicles having different ceiling configurations. In another exemplary embodiment, an upper portion of the housing assembly is mountable above the vehicle headliner, while a lower portion of the housing assembly is mountable below the headliner. Optionally, the upper and lower portions of the housing assembly clamp onto the headliner. The upper and/or the lower portions may be adjustable for mounting in different vehicles.

20 Claims, 3 Drawing Sheets

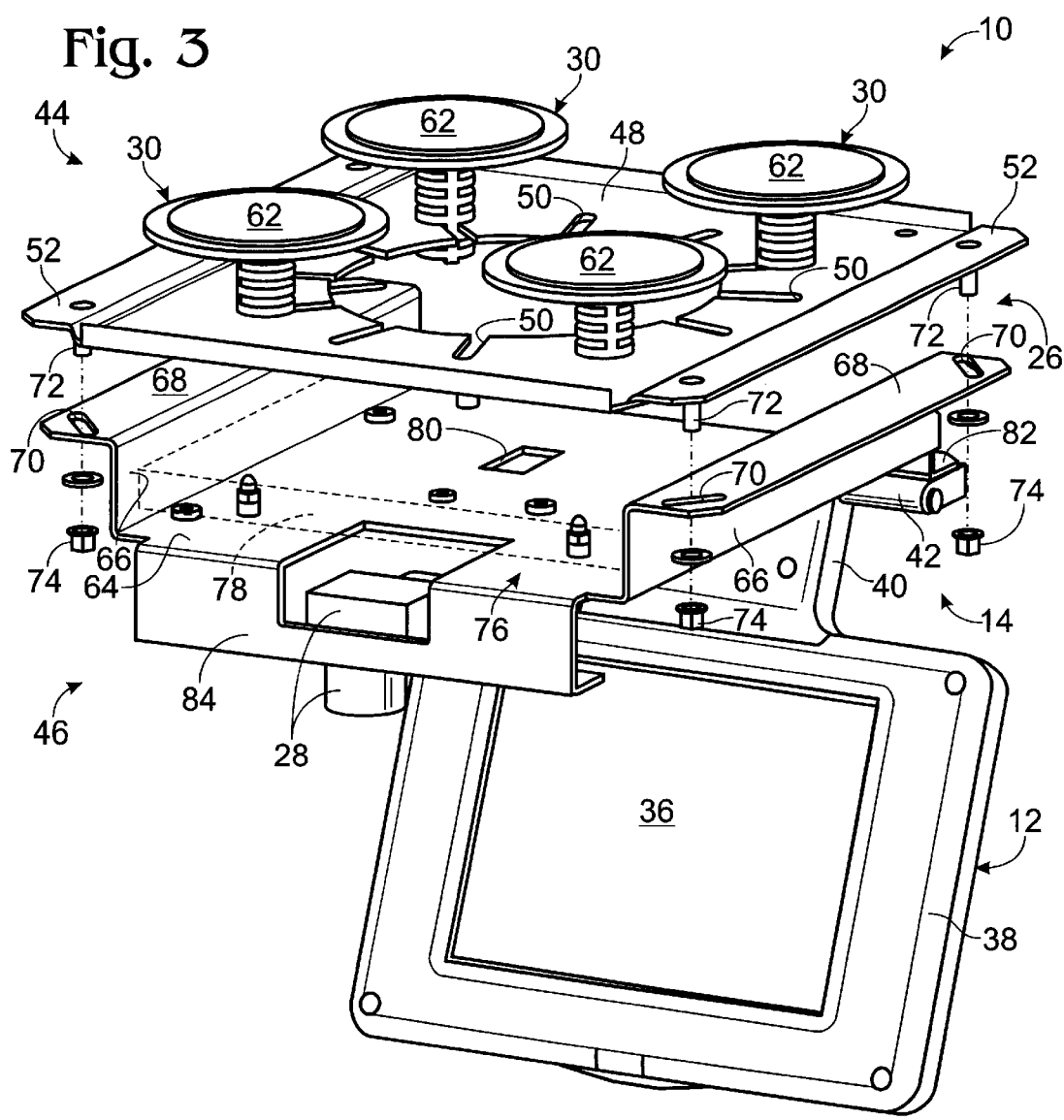
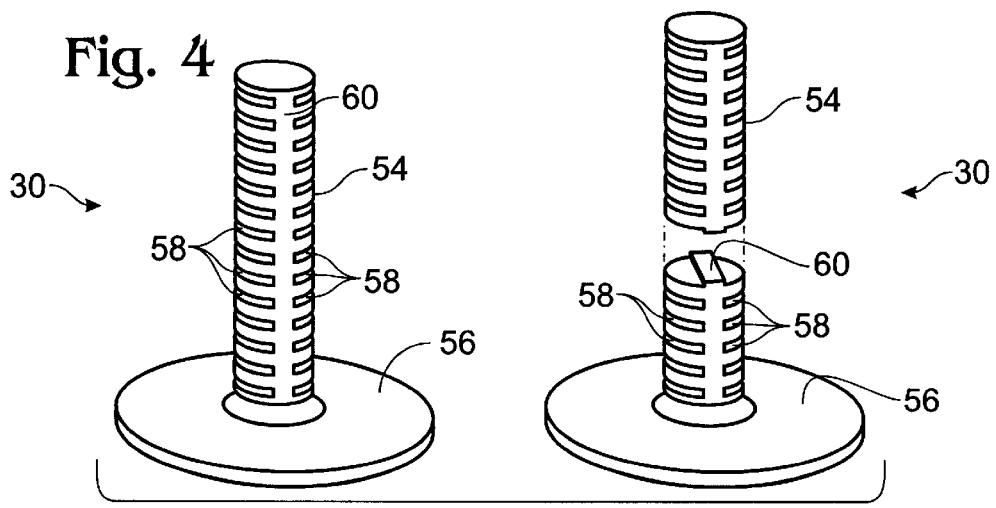

VEHICLE DISPLAY MONITOR SYSTEM

CROSS-REFERENCE TO RELATED APPLICATIONS

This application claims priority from U.S. Provisional Patent Application Serial No. 60/163,134, filed Nov. 2, 1999 for FLEX MOUNT, ROOF MOUNTING SYSTEM and U.S. Provisional Patent Application Serial No. 60/206,589, filed May 23, 2000 for DISPLAY MOUNTING SYSTEM.

FIELD OF THE INVENTION

The present invention relates to display monitors for passenger vehicles, and more particularly, to display monitor systems mountable to the ceiling of a passenger vehicle.

BACKGROUND

Display monitors have become a popular accessory for passenger vehicles, and may be used in a wide variety of applications. For example, a display monitor may be used in a vehicle as a computer monitor, a navigation display, a television, a closed-caption display for exterior cameras, etc. While some display monitors are installed during manufacture of the vehicle, others are installed after the vehicles are completed. In either case, it is preferable that the display monitor be mounted securely within the passenger compartment without detracting from the styling of the vehicle interior or interfering with the driver's view.

Vehicle display monitors may be mounted at any of various locations within the passenger compartment of a vehicle, depending on the vehicle configuration and the intended use of the monitor, One location where monitors may be mounted is on the ceiling of the vehicle. However, most vehicles have a headliner below the ceiling so the monitor must be mounted through the headliner. Since the configuration and height of ceilings and headliners vary among different vehicles, different sizes and configurations of display monitors must be manufactured to fit the different vehicles.

SUMMARY

The invention provides a ceiling-mountable display monitor system for the passenger compartment of a vehicle. The display monitor system includes a display monitor coupled to a housing assembly. In one exemplary embodiment, the housing assembly is selectively adjustable for mounting in different vehicles having different ceiling configurations. In another exemplary embodiment, an upper portion of the housing assembly is mountable above the vehicle headliner, while a lower portion of the housing assembly is mountable below the headliner. Optionally, the upper and lower portions of the housing assembly clamp onto the headliner. The upper and/or the lower portions may be adjustable for mounting in different vehicles.

BRIEF DESCRIPTION OF THE DRAWINGS

FIG. 3 is an isometric, partially exploded view of the display monitor assembly of FIG. 2 without the shroud.

FIG. 4 is an isometric view of an adjustable mount for a display monitor assembly according to the present invention.

DETAILED DESCRIPTION

Figure 1:
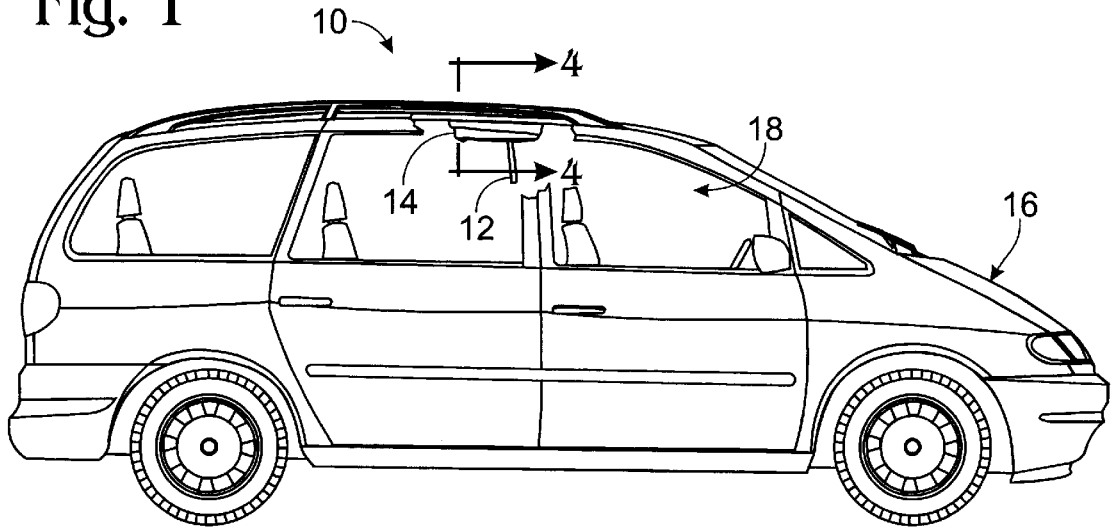
FIG. 1 is a side elevation of an exemplary passenger vehicle having a display monitor system according to the present invention. The vehicle is partially fragmented to show the display monitor mounted to the ceiling of the vehicle.
Figure 2:
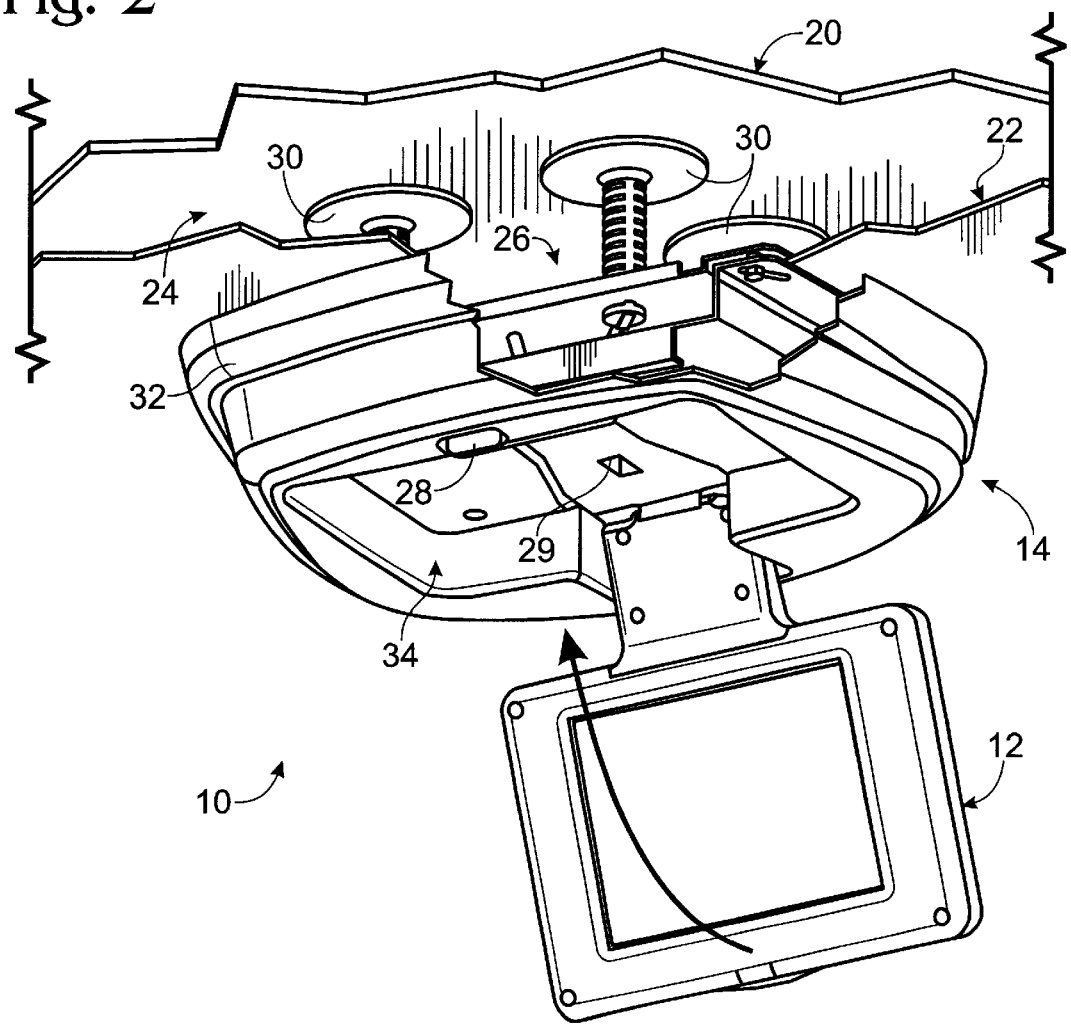
FIG. 2 is an isometric close-up view of a ceiling monitor mounted to a vehicle ceiling according to the present invention. The vehicle ceiling and headliner, as well as the monitor shroud are partially fragmented to show the monitor assembly clamped to the headliner and the mounts attached to the ceiling.

A display monitor system for a passenger vehicle according to the present invention is indicated generally at 10 in FIGS. 1 and 2. System 10 includes a display monitor 12 and a housing assembly 14 coupled to the display monitor. Housing assembly 14 is mountable to the ceiling of a vehicle to support the monitor beneath the ceiling. In one embodiment of the invention, housing assembly 14 is selectively adjustable to mount to the ceilings of different vehicles.

In the exemplary embodiment depicted in FIG. 1, display monitor system 10 is installed in a passenger vehicle 16 in the form of a van. However, it will be appreciated that system 10 may be installed in any type of passenger vehicle including a car, truck, motor home, etc. Additionally, while system 10 is shown installed in the passenger compartment 18 of vehicle 16 rearward of the driver's seat for viewing by rear passengers, it will be understood that system 10 may be installed at any desired location in the passenger compartment for viewing by any or all of the occupants.

As illustrated in FIG. 2, vehicle 16 includes a ceiling 20 extending above at least a portion of passenger compartment 18. Ceiling 20 typically forms the roof of vehicle 16 and may include a variety of structural members (not shown) such as ribs, beams, etc. Ceiling 20 is often constructed of a metal such as steel, but may be constructed of any suitable material including aluminum, composites, etc. Vehicle 16 also includes a headliner 22 extending beneath at least a portion of ceiling 20. Headliner 22 is typically made of a relatively lightweight material such as a foam board, paper board, plastic, etc. The headliner may have an aesthetic face or covering (not shown) on its lower surface to match the interior of passenger compartment 18. The covering may be formed of any suitable material such as fabric, vinyl, etc., and may be attached to the headliner by gluing, sewing, or other suitable means. Headliner 22 may also have a similar or dissimilar covering on its upper surface, or may have no covering.

The thickness of headliner 22 typically ranges from approximately 0.188-inch to approximately 0.750-inch, however a headliner thickness outside this range is also within the scope of the invention. Headliner 22 usually is spaced apart from ceiling 20, thereby forming a gap or space 24 between the ceiling and headliner. The height of space 24 varies among different vehicles, with typical spaces being in the range of approximately 0.375-inch to approximately 1.250-inches from the top of the headliner to the bottom of the ceiling. However, spaces with different heights are also possible and within the scope of the invention. In addition, structural features on the ceiling such as ribs (not shown) may be closer to the headliner than the surrounding ceiling, or even in contact with the headliner.

Display system 10 is adapted for attachment to any of a wide variety of vehicles having different ceiling configurations. In the exemplary embodiment, system 10 is selectively adjustable for mounting in vehicles having different headliner thicknesses, and/or different-size spaces between the ceiling and headliner, and/or ceilings with different structural members. As will be described in more detail below, an upper portion of housing assembly 14 is mounted above headliner 22 in space 24, while the lower portion of housing assembly 14 extends below the headliner into passenger compartment 18.

Housing assembly 14 includes a base assembly 26 coupled to display monitor 12 and configured to support the monitor adjacent the vehicle ceiling. The display monitor may be any type of display device as needed for a particular application. In the exemplary embodiment, monitor 12 is in the form of a flat-panel display such as are well known to those of skill in the art. Alternatively, the display monitor may be a cathode ray tube, or any other type of display whether now known or later developed.

Figure 5:
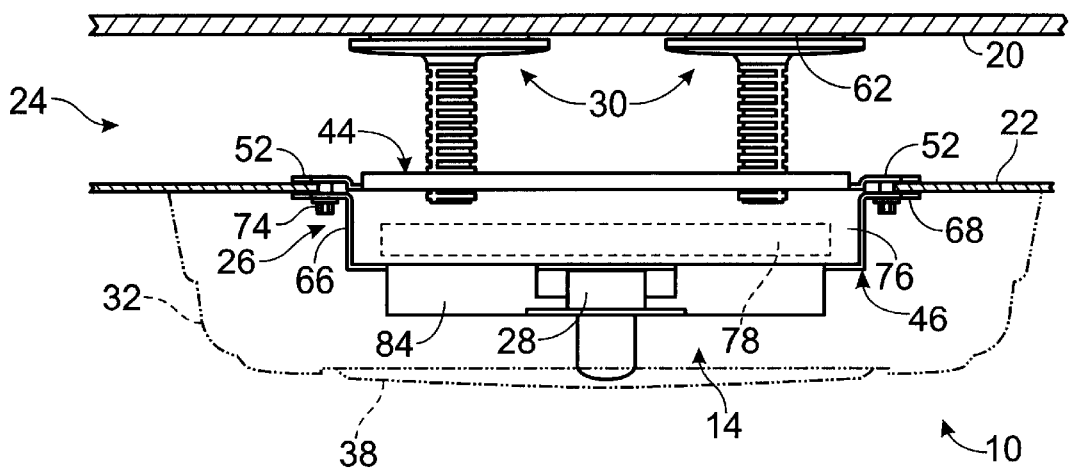
FIG. 5 is a front elevation view of a display monitor assembly mounted to a vehicle ceiling according to the present invention, with the shroud shown in dashed lines and the ceiling and headliner shown in cross-section.
Figure 6:
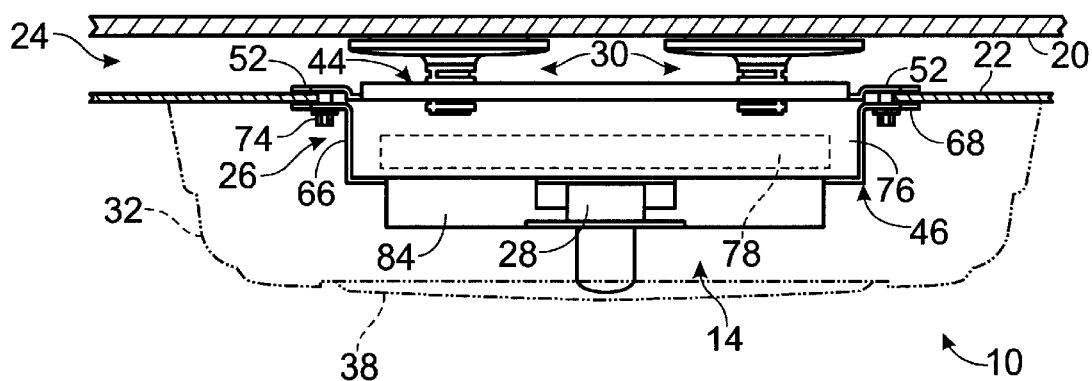
FIG. 6 is similar to FIG. 5, but shows the display monitor assembly mounted to a vehicle where the headliner is closer to the ceiling than in FIG. 4.
Figure 7:
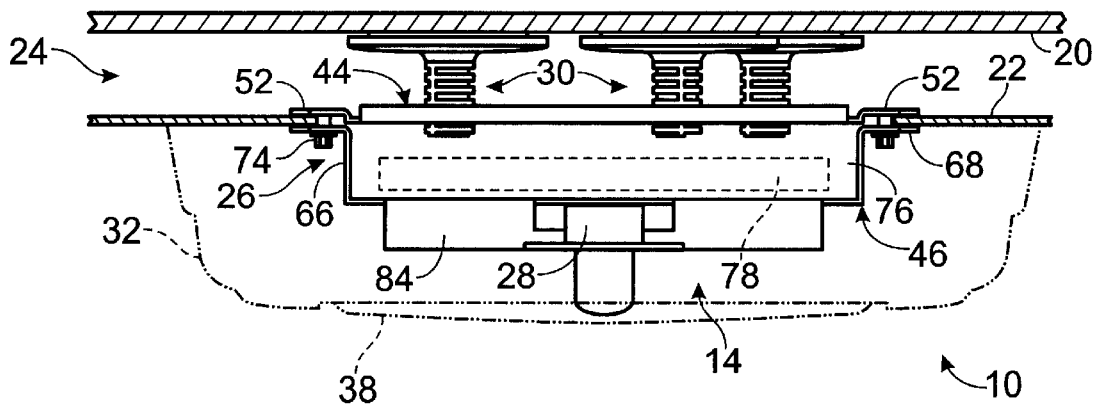
FIG. 7 is similar to FIG. 5, but shows one of the mounts adjusted laterally from its position as shown in FIG. 4.

Monitor 12 is selectively pivotal between an operative position below the headliner (as shown in FIG. 2), and a stowed position within housing assembly 14 (as shown in FIGS. 5–7). A selectively releasable latch assembly 28 may be connected to the base assembly and adapted to engage a portion of the display monitor and hold the monitor in the stowed position. The housing assembly may also include a biasing member such as a spring (not shown), which is adapted to bias the monitor toward the operative position when latch assembly 28 is released. A switch 29 may be positioned on the base assembly to activate the monitor when in the operative position, and to deactivate the monitor when in the stowed position. Switch 29 may be any suitable switch such as an optical switch actuated by ambient light when the monitor is pivoted to the operative position, or a mechanical switch actuated by the display monitor. Alternatively, the monitor may be actuated by a switch or button on a remote control device. In an alternative embodiment, the monitor may be rigidly connected to the housing assembly in the operative position.

Housing assembly 14 also includes one or more mounts 30 connected to base assembly 26 and adapted to attach to vehicle ceiling 20. At least one of mounts 30 is adjustable, relative to the base assembly, to accommodate different ceiling configurations. In one alternative of the exemplary embodiment, mounts 30 are vertically adjustable relative to the base assembly. As a result, the vertical depth of housing assembly 14 is selectively adjustable to adapt to different vehicles. In another alternative of the exemplary embodiment, one or more of mounts 30 are horizontally adjustable relative to the base assembly. Housing assembly 14 thus is adjustable to adapt to a variety of different ceiling configurations, including ribs, etc. In the embodiment described below, housing assembly 14 includes a plurality of mounts, each of which are both vertically and horizontally adjustable. In other alternative embodiments, one or more of the mounts may not be adjustable, or may be adjustable in other ways.

The housing assembly also includes a shroud 32 adapted to at least partially enclose the base assembly. In the exemplary embodiment, shroud 32 is attached to base assembly 26 beneath headliner 22 to provide an aesthetic cover for the base assembly. The shroud may be attached to the base assembly by any suitable means including screws, clips, adhesive, hook-and-loop devices, snap-on connectors, etc. The shroud includes a recess 34 adapted to at least partially receive the display monitor when the monitor is in the stowed position. The shroud is typically constructed of plastic and may be trimmed to lie flat against the bottom surface of the headliner. Alternatively, shroud 32 may be constructed of any other suitable material.

Turning attention now to FIG. 3, a partially exploded view of exemplary display system 10 is shown with shroud 32 removed. As can be seen, display monitor 12 includes a display surface or screen 36 mounted in a housing 38. One end of a pivot arm 40 is attached to housing 38. The other end of arm 40 is pivotally coupled to base assembly 26 by one or more pivot couplings 42. Optionally, monitor 12 may include one or more controls (not shown) for operating the display.

Base assembly 26 includes an upper section 44 and a lower section 46, also referred to herein as frame members. The upper and lower sections are typically constructed of a relatively rigid material such as steel, aluminum, plastic, etc. In alternative embodiments, the base assembly may be configured as a single frame member or section, or it may be configured as more than two frame members or sections. Upper section 44 includes a support plate 48 defining one or more connecting regions 50 adapted to connect to mounts 30. In the exemplary embodiment, connecting regions 50 are formed as slots radiating outward from a central aperture in plate 48. Upper section 44 also includes a pair of opposing ledges 52 that extend outward from support plate 48.

As shown in FIGS. 3–4, each mount 30 includes an elongate leg 54 extending generally perpendicularly from a substantially flat base 56. Leg 54 is generally cylindrical with a plurality of slits 58 formed on opposite sides. Each slit is generally coplanar with a slit on the opposite side of leg 54. Slits 58 extend into leg 54 less than half the diameter of the leg, thus preserving an elongate rib 60 between the opposing pluralities of slits.

Slits 58 are configured to provide rib 60 with a sufficient thickness to snugly fit in connecting slots 50. Thus, as shown in FIG. 3, mounts 30 are connectable to upper section 44 by aligning legs 54 with selected slots in support plate 48, and then sliding ribs 60 into the slots. Thus, the slits in legs 54 allow the legs to securely grip the support plate. The legs and base may be integrally formed of a single material, such as plastic, etc., or may be formed separately and attached by suitable means.

Mounts 30 are oriented with bases 56 facing upward, away from the support plate. The height of a particular base above the support plate may be adjusted by removing the corresponding leg from a slot and repositioning the leg so that a different pair of slits 58 grip the support plate. As shown in FIG. 7, the vertical length of legs 54 can be adjusted by severing a portion of the leg opposite base 56. This allows the base to be positioned relatively close to the support plate without the unused portion of the leg extending unnecessarily past the bottom of the support plate to interfere with lower section 46. The length of leg 54 may be adjusted in any of a variety of ways including cutting, fracturing, etc. Alternatively, different size legs may be provided for use on different vehicles.

A mount may also be horizontally adjusted by removing the leg and repositioning it in a different one of plural slots 50. In the exemplary embodiment, support plate 48 includes a large number of relatively closely spaced connecting regions 50 to enable relatively fine adjustments to the positions of the mounts. Alternatively, a mount may be removed altogether if necessary to prevent interference with structural members in the ceiling.

In the exemplary embodiment, mounts 30 are adapted to adhesively attach to ceiling 20. Each mount includes an adhesive material 62 disposed on the upper surface of base 56. Typically, material 62 is adhesively attached to the base. When base 56 is pressed against the ceiling, material 62 bonds to the ceiling to attach the mount to the ceiling. Any suitable adhesive material capable of attaching to ceiling 20 may be used. One example of a suitable material is acrylic psa (pressure sensitive adhesive) tape available from the Minnesota Mining and Manufacturing Company of St. Paul, Minn., under the product designation VHB 4941. According to recommendations by the manufacturer, four square inches of VHB 4941 tape should typically be used for each pound of static load to be supported. Alternatively, mounts 30 may be attached to ceiling 20 by other suitable means, including mechanical attachments (i.e., clips, screws, welding, etc.).

Lower section 46 includes a support plate 64 extending between a pair of side walls 66. Each side wall includes a ledge 68 extending outward from the side wall generally parallel to support plate 64. The lateral distance between the outer edges of ledges 68 is approximately equal to the lateral distance between the outer edges of ledges 52. Lower section ledges 68 include one or more holes 70 adapted to receive corresponding screw posts 72 extending downward from ledges 52. Nuts 74 engage screw posts 72 to connect lower section 46 to upper section 44.

Support plate 64 and side walls 66 form a partial enclosure 76 adapted to house suitable electronics 78 associated with display monitor 12. Electronics 78 include a suitable power source, or are connected to a suitable power source such as the vehicle battery. Display monitor 12 is connected to electronics 78 by one or more electrical couplings (not shown) passing through pivot arm 40. The electronics may include one or more monitor control switches as described above which are disposed adjacent an aperture 80 in support plate 64 for actuation by the monitor when pivoted between the stowed and operative positions.

Lower section 46 also includes a pair of mounting stands 82 extending downward from the rear of support plate 64. Mounting stands 82 are configured to support display monitor 12. The display monitor is attached to the mounting stands by one or more pivot couplings 42, which are removable connected to mounting stands 82 by one or more screws (not shown) extending through the pivot couplings into the mounting stands. A latch platform 84 extends downward from the front of support plate 64 to position latch assembly 28 adjacent recess 34 (see FIG. 2) in shroud 32 to hold the monitor within the recess. The latch assembly is attached to platform 84 by one or more screws (not shown).

While one particular embodiment of display monitor system has been described above, those of skill in the art will appreciate that many different configurations are possible within the scope of the invention. In an alternative embodiment, mounts 30 may be threaded to adjustably engage corresponding threaded holes on the base assembly. Similarly, electronics 78 may be disposed in monitor housing 38 or at some location within vehicle 16. In such case, lower section 46 may be omitted and the shroud and display monitor may be attached to upper section 44. In view of the many variations and modifications which are possible, it will be understood that the embodiment described herein is intended to illustrate the invention without limiting its scope.

In any event, display monitor system 10 is configured for mounting in a variety of vehicles having different ceiling configurations as illustrated in FIGS. 5–7. Upper section 44 is positionable above headliner 22 in space 24. Typically, an aperture is formed in the headliner to receive the upper section. In the exemplary embodiment, the aperture in the headliner is narrower than the outer edges of ledges 52. Thus, the upper section is installed by angling the upper section to insert one ledge behind the headliner, and then raising the opposite edge above the headliner. When the upper section is approximately centered over the headliner, ledges 52 extend past the edges of the aperture, allowing the upper section to rest on the top of the headliner. As will be appreciated, ledges 52 may be slightly higher than support plate 48, to allow the support plate to extend generally level with the headliner. Alternatively, the support plate may extend above and/or below the headliner.

One or more mounts 30 can be installed to connect the upper section to ceiling 20. A mount is typically inserted through the central aperture in support plate 48 until base 30 is adjacent the ceiling. If necessary, the vertical length of leg 54 can be shortened to avoid interference with electronics 78. The mount is then slid into one of the plural slots 50. Additional mounts may be installed in the same manner. Although four mounts are shown in the exemplary embodiment, fewer or more mounts may be used as desired. It may be desirable to pull down on upper section 44 while installing the mounts to prevent accidental contact of adhesive material 62 with the ceiling. Headliner 22 is usually sufficiently flexible to allow the upper section to be held slightly below its nominal position. Once mounts 30 are in position on upper section 44, the upper section is pressed upward to bring the adhesive material into contact with the ceiling. Typically, the adhesive material cures relatively quickly to provide a secure attachment between the upper section and the ceiling. In addition, headliner 22 supports the upper section while the adhesive cures, and may continue to provide at least partial support after the adhesive has cured.

One advantage of the embodiment of system 10 in which the housing assembly is adhesively attached to the vehicle ceiling is that no permanent damage is caused to the ceiling. In contrast, other ceiling-mounted display monitors require holes to be formed in the ceiling to receive bolts or similar attachment devices. System 10 is also quicker and easier to install than the other monitors which require forming holes in the vehicle ceiling.

Once upper section 44 has been installed, lower section 46 can be positioned beneath the headliner so that holes 70 are aligned to receive screw posts 72. Nuts 74 are then tightened on the screw posts to connect the upper and lower sections. Lower section ledges 68 extend beyond the aperture in the headliner so that the edges of the aperture are clamped or gripped between the upper section and the lower section. Thus, headliner 22 at least partially supports the display system against lateral rocking, vibration, etc. Shroud 32 is attached to the base assembly as described above.

As can be seen by comparing FIGS. 5 and 6, the vertical depth of housing assembly 14 is selectively adjustable for mounting in vehicles having different size spaces between the ceiling and headliner. Specifically, the housing assembly is selectively adjustable to align a selected portion of the housing assembly (e.g., upper section 44, lower section 46 and/or shroud 32) with the headliner. In FIG. 5, mounts 30 are adjusted to have a relatively large vertical height above support plate 48 to roughly match the height of the ceiling above the headliner. In FIG. 6, mounts 30 are adjusted to have a relatively small vertical height above the support plate to match the small clearance between the ceiling and headliner. In addition, the vertical length of the mounts are reduced to avoid any corresponding interference with electronics 78.

FIG. 7 shows another installation of display system 10 in which the front-most mount on the right side (as seen in FIG. 7) has been horizontally adjusted (to the left of its position in FIG. 5) by placement of the mount in a connecting region to the left of the original connecting region. As described above, a mount may also be horizontally adjusted by removing the mount from one of the slots and replacing the mount in a different slot. Such horizontal adjustment may be desirable, for example, to avoid a structural member (not shown) on the ceiling. It will be appreciated that several or all of the mounts may be vertically and/or horizontally adjusted.

Where plural mounts are used, each mount may be adjusted independently of the other mounts. This allows system 10 to conform to virtually any ceiling configuration. For example, if the ceiling in FIG. 5 had a flat beam directly above the mounts on the left side, the left mounts could be shortened to contact the beam while the right mounts would remain relatively long to contact the ceiling. Thus, display system 10 would be securely mounted in a level orientation aligned with the headliner even though the ceiling was not flat.

As described above, the invention provides a versatile system for mounting a display monitor in a passenger vehicle. System 10 is easily adaptable for use with many different vehicles having widely varying ceiling configurations. Further, the system can be quickly and easily installed in a vehicle without causing damage to the ceiling.

It is believed that the disclosure set forth above encompasses multiple distinct inventions with independent utility. While each of these inventions has been disclosed in a selected form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A display monitor system for mounting to the ceilings of vehicles having different ceiling configurations, the system comprising:
   a display monitor;
   a base assembly coupled to the display monitor and configured to support the display monitor adjacent the vehicle ceiling; and
   one or more mounts connected to the base assembly and adapted to attach to the vehicle ceiling;
   where at least one of the mounts is movably adjustable, relative to the base assembly, to accommodate different ceiling configurations; and
   where the vertical length of the mount is adjustable.

2. A display monitor system for mounting to the ceilings of vehicles having different ceiling configurations, the system comprising:
   a display monitor;
   a base assembly coupled to the display monitor and configured to support the display monitor adjacent the vehicle ceiling; and
   one or more mounts connected to the base assembly and adapted to attach to the vehicle ceiling;
   where at least one of the mounts is movably adjustable, relative to the base assembly, to accommodate different ceiling configurations; and
   where the base assembly includes a plurality of connecting regions adapted to connect to the one or more mounts, and where the at least one mount is movably adjustable by disconnecting the at least one mount from one of the plural connecting regions and reconnecting the at least one mount to a different one of the plural connecting regions.

3. A display monitor system for mounting to the ceilings of vehicles having different ceiling configurations, the system comprising:
   a display monitor;
   a base assembly coupled to the display monitor and configured to support the display monitor adjacent the vehicle ceiling; and
   one or more mounts connected to the base assembly and adapted to attach to the vehicle ceiling;
   where at least one of the mounts is movably adjustable, relative to the base assembly, to accommodate different ceiling configurations; and
   where the one or more mounts are adapted to adhesively attach to the vehicle ceiling.

4. The system of claim 3, where the at least one mount is horizontally adjustable relative to the base assembly.

5. The system of claim 3, where the at least one mount includes a plurality of mounts, and where each of the plural mounts is movably adjustable independent of the other mounts.

6. The system of claim 3, where the at least one mount is selectively removable from the base assembly.

7. A display monitor system for mounting to the ceilings of vehicles having different ceiling configurations, the system comprising:
   a display monitor;
   a base assembly coupled to the display monitor and configured to support the display monitor adjacent the vehicle ceiling; and
   one or more mounts connected to the base assembly and adapted to attach to the vehicle ceiling;
   where at least one of the mounts is movably adjustable, relative to the base assembly, to accommodate different ceiling configurations; and
   where the vehicle includes a headliner extending beneath at least a portion of the vehicle ceiling, and where the base assembly includes an upper section positionable above the headliner.

8. The system of claim 7, where the base assembly includes a lower section positionable below the headliner.

9. The system of claim 8, where the upper section of the base assembly is configured to be at least partially supported by the headliner.

10. The system of claim 8, where the upper section and the lower section are configured to grip the headliner.

11. A display monitor system mountable to the ceiling of a vehicle, where the vehicle includes a headliner spaced beneath the ceiling, the system comprising:
- a display monitor; and
- a housing assembly mountable to the vehicle ceiling and coupled to the display monitor to support the display monitor beneath the vehicle ceiling;
- where the housing assembly has a depth, and where the housing assembly is adjustable to change its depth so that a selected portion of the housing assembly aligns with the headliner when the housing assembly is mounted to the vehicle ceiling; and
- where the housing assembly includes at least one mount adapted to attach to the vehicle ceiling, and where the vertical length of the mount is adjustable.

12. A display monitor system mountable to the ceiling of a vehicle, where the vehicle includes a headliner spaced beneath the ceiling, the system comprising:
- a display monitor; and
- a housing assembly mountable to the vehicle ceiling and coupled to the display monitor to support the display monitor beneath the vehicle ceiling;
- where the housing assembly has a depth, and where the housing assembly is adjustable to change its depth so that a selected portion of the housing assembly aligns with the headliner when the housing assembly is mounted to the vehicle ceiling; and
- where the housing assembly includes an upper portion and a lower portion, and where the upper portion extends above the headliner and the lower portion extends below the headliner when the housing assembly is mounted to the vehicle ceiling.

13. The system of claim 12, where the upper portion is at least partially supported by the headliner when the housing assembly is mounted to the vehicle ceiling.

14. The system of claim 12, where the upper portion and the lower portion clamp onto the headliner.

15. The system of claim 12, where the upper portion has a depth, and where the upper portion is adjustable to change its depth to correspond to the space between the vehicle ceiling and the headliner.

16. A display monitor system mountable to the ceiling of a vehicle, where the vehicle includes a headliner spaced beneath the ceiling, the system comprising:
- a display monitor; and
- a housing assembly mountable to the vehicle ceiling and coupled to the display monitor to support the display monitor beneath the vehicle ceiling;
- where the housing assembly has a depth, and where the housing assembly is adjustable to change its depth so that a selected portion of the housing assembly aligns with the headliner when the housing assembly is mounted to the vehicle ceiling; and
- where the housing assembly is adhesively mounted to the vehicle ceiling.

17. A display monitor system mountable to the ceiling of a vehicle, where the vehicle includes a headliner spaced beneath the ceiling, the system comprising:
- a frame member configured to at least partially fit between the headliner and the vehicle ceiling to be supported by the headliner;
- at least one selectively adjustable mount connected to the frame member and adapted to attach to the vehicle ceiling; and
- a display monitor coupled to the frame member; and
- where the at least one mount is adapted to adhesively attach to the vehicle ceiling.

18. The system of claim 17, where the at least one mount is vertically adjustable relative to the frame member.

19. A display monitor system mountable to the ceiling of a vehicle, where the vehicle includes a headliner spaced beneath the ceiling, the system comprising:
- a frame member configured to at least partially fit between the headliner and the vehicle ceiling to be supported by the headliner;
- at least one selectively adjustable mount connected to the frame member and adapted to attach to the vehicle ceiling; and
- a display monitor coupled to the frame member; and
- where the at least one mount has a vertical length, and where the vertical length of the mount is adjustable.

20. The system of claim 19, where the at least one mount is horizontally adjustable relative to the frame member.

* * * * *